Feb. 17, 1931.  A. BLACK  1,792,480
AIRCRAFT BODY
Filed Oct. 14, 1926   2 Sheets-Sheet 1

Archibald Black
INVENTOR.

Feb. 17, 1931. A. BLACK 1,792,480
AIRCRAFT BODY
Filed Oct. 14, 1926 2 Sheets-Sheet 2

Archibald Black
INVENTOR.

Patented Feb. 17, 1931

1,792,480

UNITED STATES PATENT OFFICE

ARCHIBALD BLACK, OF GARDEN CITY, NEW YORK

AIRCRAFT BODY

Application filed October 14, 1926. Serial No. 141,571.

My invention relates to airplane and other aircraft bodies and more particularly to those used for the carriage of mail, packages and similar matter.

This invention provides a type of aircraft body for the transportation of packages which permits efficient storing and securing of the cargo; which provides means for preventing damage to the cargo in case of bad landing or accident; which permits convenient handling and sorting of the cargo by the crew while the aircraft is in flight or at rest; which permits convenient dropping of packages while the aircraft is in flight and which provides a warning signal system and other means for eliminating the danger of injury to occupants of the cargo compartment when the aircraft is being taken off the ground or is being landed thereon or is being caused to execute some maneuver while in flight.

Figures 1, 2, 3:
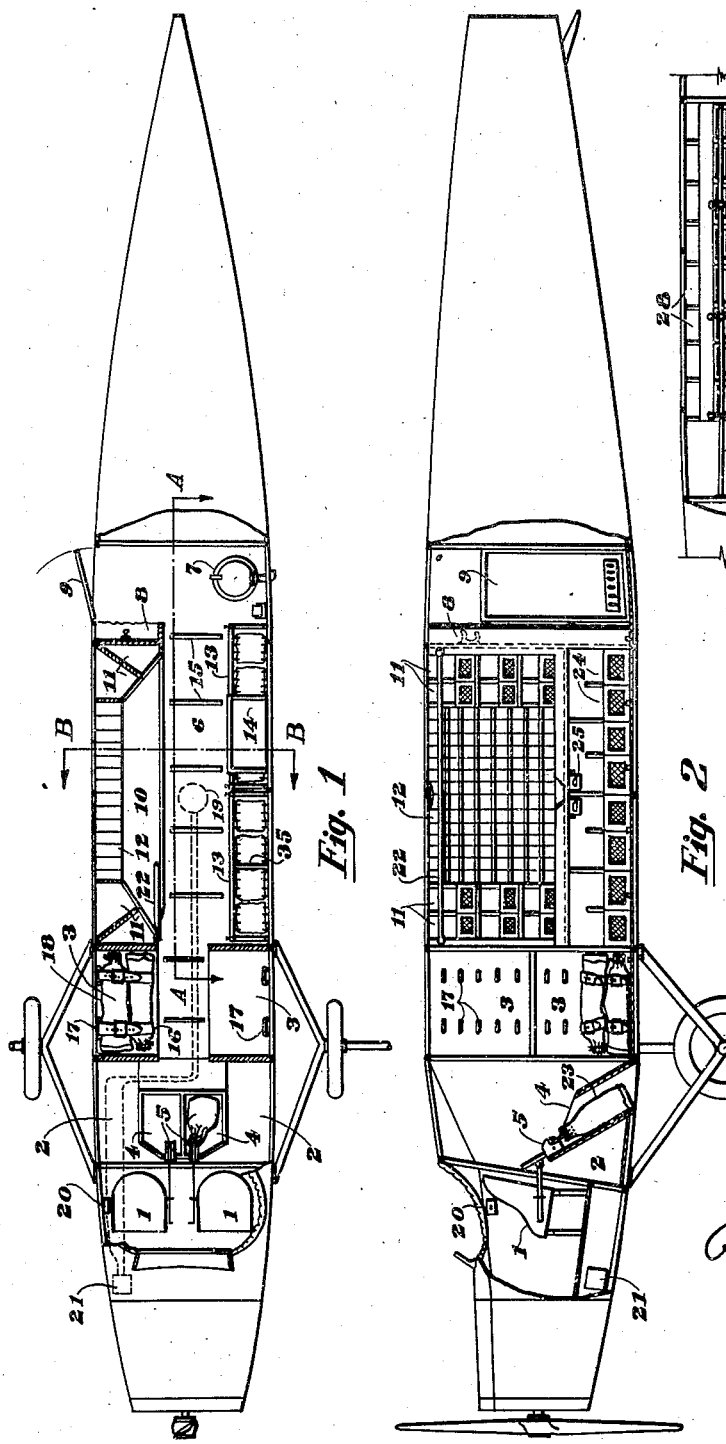
Figure 4:
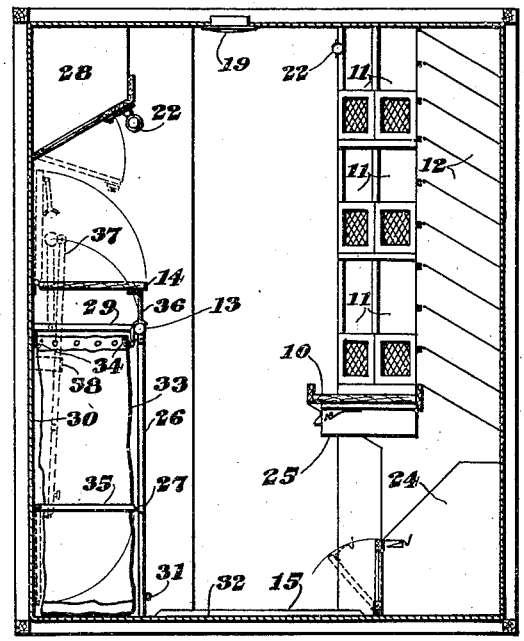
Figure 5:
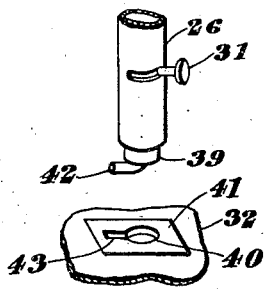
Figure 9:
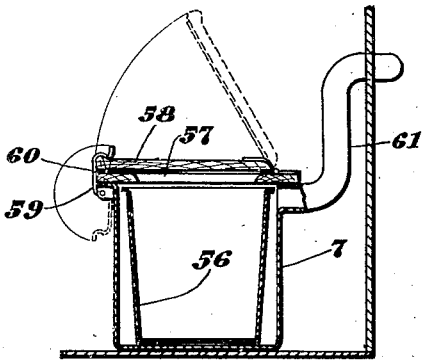
Figure 6:
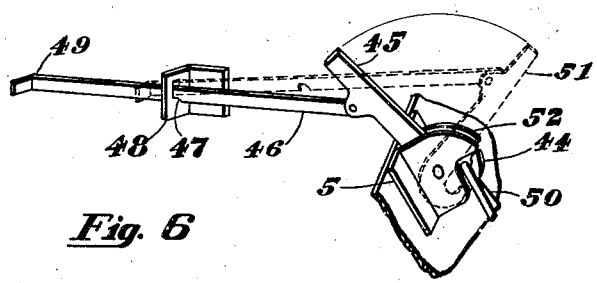

In the accompanying drawings Fig. 1 is a plan view of an airplane body incorporating the features of my invention, a portion of the top of the said body being removed in order to clearly illustrate the arrangement and equipment of the interior. Fig. 2, is an elevation of the left side of the same body, a portion of the side being removed to show a longitudinal section through part of the interior, the said section being taken in a vertical plane at approximately the center line of the body. Fig. 3, is a longitudinal section through the body on the line A—A, in Fig. 1, and looking in the direction indicated by the arrows. Fig. 4, is a cross section through the body on the line B—B, in Fig. 1, looking in the direction indicated by the arrows. Fig. 5, is a detail view showing the method of securing the sorting racks to the floor to prevent their movement, while Fig. 6, is a perspective sketch of the device used for dropping of mail pouches or packages while in flight. Fig. 7, is a detail sketch of the strap used for securing mail pouches or packages to prevent their movement during flight. Fig. 8, is a wiring diagram of the signal system which I provide to enable the pilot to communicate warnings to the occupants of the cargo compartment. Fig. 9, is a vertical section through the special type of toilet which I provide for the use of the occupants of the cargo space to further carry out one of the purposes of my invention in preventing damage to the cargo.

In Fig. 1, the body shown is provided with pilot's seats 1, storage spaces 2, for packages about to be dropped in flight and large storage spaces 3, for the main storage of packages. Spaces 3, are located about the center of gravity of the aircraft to permit convenient operation under different conditions of loading. Dropping chutes 4, are provided for convenient dropping of packages while in flight and are equipped with releasing devices 5, to facilitate their use. Package sorting space 6, is provided to enable the crew to sort packages while the aircraft is in flight and the said space is provided with toilet 7, for the convenience of the crew, and with hat and overcoat closet 8, having a curtained closure. Entrance door 9, is provided to facilitate entrance, exit and loading or unloading while the aircraft is on the ground. Package sorting space 6, is equipped with sorting table 10, having package receptacles 11, at each end thereof and having letter receptacles 12, between receptacles 11. On the opposite side of compartment 6, are provided pouch racks 13, and sorting table 14. The actual use of the sorting facilities by the crew substantially follows the practices established in the use of facilities provided in railway mail cars, the special provisions of my invention making such practicable. To prevent the occupants of the sorting space 6, from slipping when the airplane is inclined at a large angle, the floor of the space is provided with cleats 15, raised above its surface. To prevent packages from moving around while the aircraft is in flight I provide storage spaces 3, with several straps 16, which pass through rings 17, and around packages such as mail pouches 18. As rings 17, are attached securely to the body framework, as will be shown later, the contents of the storage spaces 3, are thus strapped in place in such manner as to prevent their movement during flight. Furthermore, as a multiplicity of straps 16, and rings 17, are provided in each space 3, the packages or mail pouches as 18, may be strapped in place either individually or in such groups as may be desirable to facilitate convenient removal of all or any part of the contents of a whole storage space 3. Sorting space 6, is lighted by means of electric ceiling light 19, which is also used for signal purposes as will be described.

To prevent injury of the occupants of the sorting space 6, by their being thrown about when the airplane is being landed or is executing some maneuver, I provide both a warning signal and means adapted to be held by the occupants while the danger exists. The warning signal is provided by interposing special switch 20, in the electrical circuit between ceiling light 19, and source of supply 21, in a manner to be described later. By means of switch 20, the pilot of the aircraft is enabled to communicate a signal to the occupants of space 6, by dimming the illumination thereof. When a landing is to be made, the pilot will give a prearranged signal in this manner whereupon the occupants of space 6, will brace themselves for the shock of landing, or such, by gripping overhead rod 22, this rod being shown broken off in Fig. 1, for the purpose of clarity.

In Fig. 2, package dropping chutes 4, instead of being vertical are shown to be inclined at an appreciable angle therefrom so that the package 23, may be discharged into the air flowing backwards past the lower end of the chute without delay. This inclination is an important feature of the invention as it allows a slight suction to be set up in chute 4, and prevents delay in discharge of the package through its being hurled against the rear wall of the chute by the rush of air passing the lower end. Were the chutes placed vertically instead of being inclined as shown, there would be danger of a slight upward current of air existing in each chute and, in any case, there would exist a strong tendency for the rush of air past the lower end to interfere with the free fall of packages. Indeed, a package of substantial size but of light weight might become held in place at the bottom of the chute for a moment or two instead of dropping freely. Such delay might prevent packages from falling in intended places and might cause them instead to fall into water, or under the wheels of moving vehicles or to fall in some other manner which would expose them to injury or loss. Receptacles 24, are provided for receiving mail or packages to be sorted or which have been sorted, while drawers 25, are provided for holding of small papers, orders, and such material.

In Fig. 3, the pouch racks are provided with legs 26, having front bars 27, to prevent the pouches from swinging outwards with side motion of the aircraft. Additional package sorting boxes 28, similar to boxes 11, are provided above racks 13. Grab rods 22, are shown to be provided overhead and on each side of the space.

In Fig. 4, the manner of folding pouch racks 13, and table 14, is shown. The rack 13, is carried by hinged members 29, fastened to wall 30, and legs 26, are provided with locking bolt 31, by which they may be fastened down to the floor 32, to prevent their movement with sudden movements of the aircraft. Pouches 33, are suspended from hooks 34, carried by racks 13, and wall 30, and are held against swinging endwise of the compartment by cross bars 35, hinged at one end to wall 30, and pointed at the opposite end to engage a hole in front bar 27. Thus, when the various members are assembled, the pouches 33, are suspended in place and are prevented from swinging either forward or endwise. Hooks 34, may be of the so-called safety-snap type as used for carriage harness, which type is provided with snap catch to prevent articles from becoming unhooked accidentally. By using this type of hook, the pouches 33, would be prevented from jumping off the hooks with sudden movements of the aircraft. Sorting table 14, is hinged to wall 30, and is provided with hinged legs 36, adapted to engage racks 13, and to support its outer edge thereby. Dotted lines 37, show the position of the various parts when folded against wall 30. When so folded they may be held in place against movement by strap 38.

In Fig. 5, is shown the method of securing legs 26, to floor 32. Leg 26, has reduced diameter extension 39, adapted to engage hole 40, in plate 41, set into floor 32. Locking bolt 31, is provided with bent portion 42, adapted to pass through slot 43, in hole 40. The leg 26, is locked in place by passing portion 42, through slot 43, and then turning it whereupon it engages the lower side of plate 41, and locks leg 26, securely to floor 32. By these means I provide sorting facilities which are convenient to use, which are rigid when erected but which may be folded and held out of the way against the wall of the compartment when not required.

In Fig. 6, release device 5, is provided with hook 44, having operating handle 45, for use in setting the device. Locking bar 46, is provided with notch 47, arranged to engage plate 48, when the device is set for use. Bar 46, is provided with handle 49, located for convenient operation by the pilot but which might, if desired, be operated by one of the crew standing in space 2. Handle 49, also serves to indicate to the pilot, by its position, whether or not the release device is set for operation. The device is released by lifting handle 49, whereupon the weight of the package carried by cord 50, pulls down 44, brings the various parts to the position shown by dotted lines 51, and releases cord 50, thus dropping the package. Device 5, is provided also with extensions 52, arranged to substantially close the opening of hook 44, so that cord 50, cannot jump off through sudden movement of the aircraft. In the preferred use of this device, the packages would be set in place for dropping by a member of the sorting screw and would be dropped by the pilot releasing the device at the proper moment. This assignment of operations is important as it relieves the pilot of the necessity of giving any attention to the device until it becomes necessary for him to use it. At the same time, the arrangement of operations also relieves the sorting crew of the necessity of releasing the packages and allows them to continue their other work once the device is loaded. It is particularly important that control of releasing means be left to the pilot, or to an occupant of one of the seats 1, as proper vision of the course of the aircraft is essential to discharge of the packages in the proper locations. My invention provides such an arrangement while, at the same time, permitting the members of the sorting crew to load the dropping means.

In Fig. 7, the preferred method of attaching straps 16, and rings 17, is shown. Rings 17, are formed of bar material bent to shape, passed through compartment wall 53, and welded to tubular frame member 54. In this manner the stresses, caused by the weight of the packages pulling on the straps, are transmitted directly to the aircraft frame.

Fig. 8, shows the method of arranging the signal system light 19, being fed from battery or other source of supply 21. One wire is carried direct, while the other passes through special switch 20, located within reach of the pilot. Normally, switch 20, remains closed but, when operated by the pilot, it is opened and the current is then diverted through resistance 55, and hence light 19, is dimmed. In this manner a convenient means of signalling is provided which requires but little additional equipment and which provides a type of signal which cannot be overlooked accidentally by lack of attention on the part of the sorting crew. In the application of this system, such other means for control of light 19, as might be desired, might be provided without affecting the use of the compartment lighting for signalling purposes as described.

In Fig. 9, toilet 7, is provided with removable container 56, seat 57, cover 58, and spring clamp 59, adapted to hold down cover 58. Rubber washer or gasket 60, is provided on cover 58, to make its contact with seat 57, watertight when closed. Vent 61, is carried to the external air outside of the aircraft to provide adequate ventilation and the container 56, is partly filled with a suitable disinfectant chemical. By this arrangement I eliminate danger of spilling of the contents of the toilet over the cargo in case of a bad landing or other accident. At the same time I remove the necessity for use of the type of toilet which discharges its contents overboard and which type becomes objectionable for use in aircraft flying over land.

In the foregoing description I have described and in the accompanying drawings I have illustrated the various features of my invention as applied to a mail or package carrying airplane body. It will be obvious, however, that certain, if not all, of the features might be utilized in aircraft bodies of other types or which are constructed for other uses. For example, the special type of toilet which I provide might be used to equal advantage in airships or airplanes whether constructed to carry only packages and crew, or only passengers, or all of these.

Having thus described my invention, I claim:

1. Apparatus for handling mail for use on aircraft comprising a closed compartment, for the occupancy of a mail sorter, a container for the sorted mail, a retaining device for holding said container in readiness for discharge from the aircraft, a handle—accessible only to the mail sorter—for setting the device to hold the container, and a second handle, accessible only to the pilot of the aircraft for operating said device to release the said container.

2. Apparatus for handling mail for use on aircraft comprising a closed compartment, for the occupancy of a mail sorter, a container for the sorted mail, a retaining device for holding said container in readiness for discharge from the aircraft, a handle—accessible only to the mail sorter—for setting the device to hold the container, and a hand control member which serves as an indicator to indicate to the pilot that a mail container is in readiness for release, and which member is accessible only to the pilot for the operation of said device to release said container at the proper time.

3. Apparatus for handling mail for use on aircraft comprising a closed compartment, for the occupancy of a mail sorter, a container for the sorted mail, a retaining device for holding said container in readiness for discharge from the aircraft, a handle—accessible only to the mail sorter—for setting the device to hold the container, a second handle accessible only to the pilot of the aircraft for releasing said container, and means for the communication of signals between the pilot and the sorter to facilitate the operation of the mail release mechanism.

4. Apparatus for handling mail for use on aircraft comprising a closed compartment, for the occupancy of a mail sorter, a container for the sorted mail, a retaining device for holding said container in readiness for discharge from the aircraft, a handle—accessible only to the mail sorter—for setting the device to hold the container, a latch member for retaining the said device in the holding position, and a handle accessible only to the pilot of the aircraft for the operation of said latch member to release the mail container.

5. Apparatus for handling mail for use on aircraft comprising a closed compartment, for the occupancy of a mail sorter, a container for the sorted mail, a retaining device for holding said container in readiness for discharge from the aircraft, a handle—accessible only to the mail sorter—for setting the device to hold the container, and a second handle connected to the first mentioned handle and accessible only to the pilot and serving to indicate to the pilot the position of the first handle for the purpose described.

In testimony whereof, I have signed my name to this specification, this 11th day of October, 1926.

ARCHIBALD BLACK.